(12) United States Patent
Dorenkamp et al.

(10) Patent No.: US 11,453,395 B2
(45) Date of Patent: Sep. 27, 2022

(54) METHOD FOR OPERATING A MOTOR VEHICLE, IN PARTICULAR A MOTORCYCLE, COMPUTER PROGRAM

(71) Applicant: Robert Bosch GmbH, Stuttgart (DE)

(72) Inventors: Stephan Dorenkamp, Ludwigsburg (DE); Mathieu Grelaud, Ludwigsburg (DE); Michael Schoenherr, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 16/524,902

(22) Filed: Jul. 29, 2019

(65) Prior Publication Data

US 2020/0047755 A1 Feb. 13, 2020

(30) Foreign Application Priority Data

Aug. 8, 2018 (DE) .......................... 102018213262.3

(51) Int. Cl.
*B60W 30/16* (2020.01)
*B60W 30/18* (2012.01)
*B60W 40/04* (2006.01)
*G01S 13/931* (2020.01)
*G05D 1/02* (2020.01)

(52) U.S. Cl.
CPC ...... *B60W 30/16* (2013.01); *B60W 30/18163* (2013.01); *B60W 40/04* (2013.01); *G01S 13/931* (2013.01); *G05D 1/0257* (2013.01); *B60W 2300/36* (2013.01); *B60W 2554/804* (2020.02)

(58) Field of Classification Search
None
See application file for complete search history.

(56) References Cited

U.S. PATENT DOCUMENTS

| 8,930,128 | B2* | 1/2015 | Kim | B60K 6/00 |
| | | | | 701/301 |
| 10,455,882 | B2* | 10/2019 | Strickland | G06K 9/00805 |
| 10,882,523 | B2* | 1/2021 | Knitt | B60W 10/06 |
| 2013/0311075 | A1* | 11/2013 | Tran | G08G 1/166 |
| | | | | 701/117 |
| 2019/0172354 | A1* | 6/2019 | Hoffmann | B60W 30/18163 |
| 2019/0375400 | A1* | 12/2019 | Zhang | B60W 50/14 |

FOREIGN PATENT DOCUMENTS

DE 10 2006 034 122 A1 1/2008

* cited by examiner

*Primary Examiner* — Todd Melton
(74) *Attorney, Agent, or Firm* — Norton Rose Fulbright US LLP; Gerard Messina

(57) ABSTRACT

A method for operating a motor vehicle, in particular a motorcycle, in which a driving maneuver, which includes a lane change and/or a passing maneuver, is carried out in an at least partially automated manner. The acceleration dynamics of the motor vehicle are adjusted as a function of the relative speed of at least one other motor vehicle, for example of a motor vehicle preceding and/or approaching from behind, as the driving maneuver is carried out.

15 Claims, 2 Drawing Sheets

METHOD FOR OPERATING A MOTOR VEHICLE, IN PARTICULAR A MOTORCYCLE, COMPUTER PROGRAM

CROSS REFERENCE

The present application claims the benefit under 35 U.S.C. § 119 of German Patent Application No. DE 102018213262.3 filed on Aug. 8, 2018, which is expressly incorporated herein by reference in its entirety.

FIELD

The present invention relates to a method for operating a motor vehicle, in particular a motorcycle, in which a driving maneuver, which includes a lane change and/or a passing maneuver, is carried out at least partially in an automated manner. The present invention further relates to a computer program for carrying out the method.

BACKGROUND INFORMATION

Driving maneuvers that include a lane change and/or a passing maneuver are always particularly risky and hazardous. The reason for this is frequently a misjudgment of the instantaneous traffic situation by the driver. Other road users are often overlooked, in particular when they are located in a blind spot of the motor vehicle. Motorcycles approaching from behind are particularly often overlooked, since motorcycles have a narrower view width than, for example, a passenger motor vehicle and also frequently travel significantly faster than the rest of traffic.

A multitude of conventional driver assistance systems for minimizing risk have monitoring and/or warning functions and/or actively intervene in the guidance of the motor vehicle in the event of danger. In the latter case, these systems enable an at least partially automated driving of the appropriately equipped motor vehicles.

Convention systems monitor the blind spots of a motor vehicle and when detecting an object in the blind spot, generate a visual and/or acoustic signal to warn the driver.

Conventional systems include distance measuring devices, with the aid of which the distance of the motor vehicle to additional objects located in the surroundings of the motor vehicle may be ascertained. In addition, speed values may be advantageously derived from chronologically successive distance measurements. Such a system is described, by way of example, in the German Patent Application No. DE 10 2006 034 122 A1.

In addition, conventional systems for adaptive speed control ("Adaptive Cruise Control", ACC system) regulate the speed of a motor vehicle as a function of the distance to a preceding vehicle. To maintain the distance, the speed of the motor vehicle is adapted accordingly.

SUMMARY

An object of the present invention is to enhance the safety and/or comfort when carrying out a driving maneuver in an at least partially automated manner, the driving maneuver including a lane change and/or a passing maneuver.

An example method in accordance with the present invention may achieve this object. Advantageous refinements of the present invention are described herein. A computer program for carrying out the method is also provided.

In an example method in accordance with the present invention for operating a motor vehicle, in particular a motorcycle, a driving maneuver, which includes a lane change and/or passing maneuver, is carried out in an at least partially automated manner. According to the present invention, the acceleration dynamics of the motor vehicle when carrying out the driving maneuver are adjusted as a function of the relative speed of at least one other motor vehicle, for example of a vehicle preceding and/or approaching from behind. In this way, the acceleration dynamics may be adjusted as a function of the situation, i.e., taking the particular traffic situation into account.

If, for example, a change is to be made to a traffic lane, in which the instantaneous speed of traffic is significantly faster than in the traffic lane in which the motor vehicle performing the lane change is located, the acceleration dynamics may be increased. This prevents motor vehicles approaching from behind from having to brake heavily due to the lane change. The risk of collision also decreases.

If a change is to be made to a traffic lane, in which the instantaneous speed of traffic is not faster or only insignificantly faster than the speed in the traffic lane in which the motor vehicle performing the lane change is located, the acceleration dynamics may be lowered or reduced to a minimum. This allows for a more comfortable lane change to be made.

The same applies if, alternatively or in addition to a lane change, a passing maneuver is to be carried out. By way of explanation: a passing maneuver is not always accompanied by a lane change. This is the case, for example, if the road is single-lane. Furthermore, a lane change need not always be associated with a passing maneuver. The lane change may serve only for merging a motor vehicle into the flow of traffic, for example in the area of a freeway on-ramp. Accordingly, a lane change and/or a passing maneuver, insofar as they are mentioned below, also include such driving maneuvers.

In order to be able to perform the acceleration dynamics of the motor vehicle carrying out the driving maneuver as a function of the relative speed of at least one other motor vehicle, the speed of the other vehicle must be determined beforehand and related to the speed of the motor vehicle carrying out the driving maneuver and/or related to the speed of a third motor vehicle. Based on the ascertained relative speed, it is also possible to detect the danger of a collision of the motor vehicle carrying out the driving maneuver with the second and/or with the third motor vehicle, so that counteractive measures may be taken. These measures include, in particular, the adaptation of the acceleration dynamics of the motor vehicle carrying out the driving maneuver to the instantaneous traffic situation. The adaption takes place fully automatically.

In the example method, the speed of the motor vehicle carrying out the driving maneuver is also preferably adapted to the speed of the at least one other motor vehicle. This means, that a difference between the two speeds is initially ascertained and the speed of the motor vehicle carrying out the driving maneuver is subsequently raised or lowered by the particular differential amount. In this way, the risk of collision may be further reduced. The adaptation takes place preferably fully automatically.

The relative speed of the at least one other motor vehicle is further preferably ascertained using a sensor system of the motor vehicle carrying out the driving maneuver, which includes at least one sensor aimed forward, rearward and/or to the side. With the aid of a corresponding sensor system, it is possible to monitor the motor vehicle surroundings. To enable a preferably comprehensive monitoring, it is provided that the sensor system includes at least one sensor aimed forward, at least one sensor aimed rearward and at least one sensor aimed to the side. As a minimum solution, however, it is sufficient to use only one sensor for determining the relative speed, which is aimed either forward or rearward. With the aid of a forward-directed sensor, it is possible to adapt the speed during a lane change to the speed of the motor vehicle driving ahead in the neighboring lane. With the aid of a rearward-directed sensor it is similarly possible to adapt the speed to the speed of a motor vehicle approaching in the neighboring lane. A combination of both sensors is, of course, also possible.

If the motor vehicle is equipped with a driver assistance system, it may be possible, if necessary, to resort to the sensor system of the driver assistance system. The driver assistance system also operates on the basis of data provided with the aid of sensors. In this way, the technical complexity may be reduced and a cost savings may be achieved.

The sensor system used in the method according to the present invention preferably includes at least one ultrasonic sensor and/or one radar sensor. With the aid of such a sensor, it is possible to ascertain the position and the speed of another motor vehicle located within the detection range of the sensor. Whereas ultrasonic sensors generally have a detection range of a few meters, radar sensors are also able to detect objects that are 50 m or even further away.

The relative speed of the at least one other motor vehicle is accordingly preferably ascertained using at least one radar sensor and/or one ultrasonic sensor. Based on the position data of a motor vehicle located within the detection range of the sensor, for example, it is possible to ascertain its speed absolutely and relatively with respect to the vehicle equipped with the sensor. In this way, it is also possible to predict whether a collision of the vehicles is imminent when a particular driving maneuver is carried out. If a collision is imminent, counteractive measures may be taken.

In the method provided, the relative speed of the at least one other motor vehicle is preferably ascertained using at least one sensor of an adaptive cruise control of the motor vehicle carrying out the driving maneuver. Known systems for adaptive cruise control include a sensor system, which includes at least one forward-directed sensor for maintaining a predefinable distance of the motor vehicle to at least one preceding motor vehicle. If the distance changes, the speed of the motor vehicle is adaptively adapted with the aid of an engine or brake intervention. Similarly, the speed or relative speed of at least one motor vehicle located in the neighboring lane may be ascertained with the aid of the at least one sensor of the adaptive cruise control. This assumes that the system for adaptive cruise control is activated when the method according to the present invention is carried out.

Alternatively or in addition, it is provided that the relative speed of the at least one other motor vehicle is ascertained using at least one sensor of a lane change assistance system of the motor vehicle carrying out the driving maneuver. Such a system generally includes at least one rearward-directed sensor in order to detect objects in a blind spot of the motor vehicle. With the aid of this sensor, it is possible to ascertain the speed or relative speed of a motor vehicle approaching from behind, which is located in the same lane or in a neighboring lane, to which a change is to be made.

At least one sensor aimed to the side, if present, may also be used to ascertain the relative speed of the at least one other motor vehicle. At least two sensors spaced apart from one another and each aimed to the side are preferably used to ascertain the relative speed of another motor vehicle. Because at least two sensors aimed toward the side are present, it is possible for the other motor vehicle to be detected as it passes the sensors, the detection taking place chronologically separately. The speed or the relative speed of the passing motor vehicle may then be ascertained via the time difference. In order to increase the accuracy of the speed values ascertained in this way, a first sensor is situated preferably far back and a second sensor is situated preferably far forward on the motor vehicle.

The probability of a collision is advantageously calculated on the basis of the data detected with the aid of the sensor system and a warning device, which is physically perceptible by the driver, is activated if a collision is predicted. During activation, the warning device generates a warning signal, which is preferably visually or acoustically perceptible. The warning device may, for example, include a warning light. This warning device may—depending on the level of danger—generate a continuously shining and/or blinking warning light.

Alternatively or in addition, it is provided that the driving maneuver is discontinued in the event of a predicted collision. This process takes place preferably fully automatically. In order to prevent, if necessary, a collision of the motor vehicle with a third motor vehicle and/or with another object, which is located in the same traffic lane, a preferably active intervention in the guidance of the motor vehicle discontinuing the driving maneuver is undertaken by, for example, reducing the speed of the motor vehicle. In this case, a driver assistance system such as, for example, an adaptive cruise control, may be advantageous. If present, it should be therefore preferably ensured that the driver assistance system, in particular the adaptive cruise control, is activated when carrying out the method according to the present invention.

An activated driver assistance system, in particular an adaptive cruise control, otherwise proves to be advantageous, not only when discontinuing the driving maneuver, but also when carrying out the driving maneuver. With the aid of the driver assistance system, in particular with the aid of the adaptive cruise control, it is possible to influence the acceleration dynamics of the motor vehicle carrying out the driving maneuver in order to prevent an impediment to at least one other road user and/or a collision with another road user. It is further possible with the aid of such a driver assistance system to carry out the method according to the present invention in a partially automated or fully automated manner. In this case, the driver assistance system preferably intervenes in an engine control of the motor vehicle.

In a refinement of the present invention, a computer program is therefore provided, which contains machine-readable instructions which, when they are executed on a computer and/or in a control unit, prompt the computer and/or control unit to carry out the method according to the present invention. The computer program in this case may be stored in an internal memory of the control unit or on a separate data medium usable with the control unit. Thus, the present invention also extends to a corresponding data medium or a download product including the computer program.

The present invention is explained in greater detail below with reference to the figures.

DETAILED DESCRIPTION OF EXAMPLE EMBODIMENTS

Figure 1:
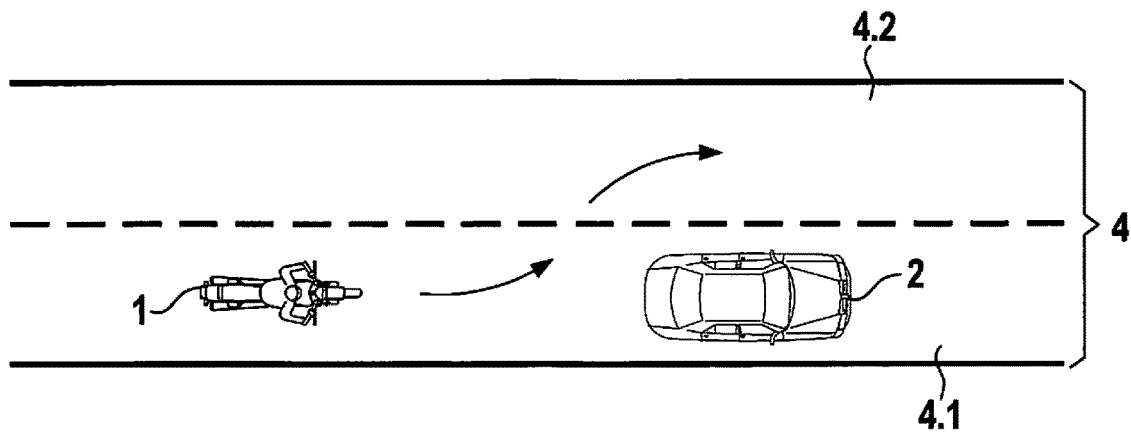
FIG. 1 shows a top view of a two-lane road for illustrating a first driving situation.

FIG. 1 shows a two-lane road 4, on which a first motor vehicle 2 in the form of a passenger car is driving, followed by a second motor vehicle 1 in the form of a motorcycle. Both motor vehicles 1, 2 are utilizing the right-hand lane of the two traffic lanes 4.1, 4.2. The distance between the motorcycle and the passenger car is decreasing since the motorcycle is traveling at a higher speed than the passenger car. Since left traffic lane 4.2 is open, the motorcycle may prepare to pass. In this case, the speed of the motorcycle may be maintained or increased.

Figure 2:
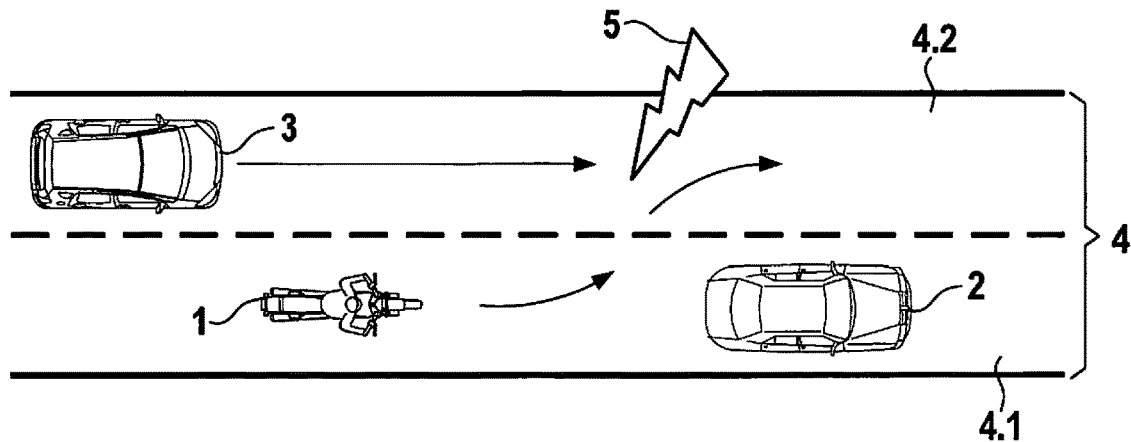
FIG. 2 shows a top view of a two-lane road for illustrating a second driving situation.

FIG. 2 shows the same road 4, on which again the passenger car (motor vehicle 2) and the motorcycle (motor vehicle 1) are moving in the same driving direction. The distance between these two motor vehicles 1, 2 is decreasing since the motorcycle is traveling at a higher speed than the passenger car. The motorcycle is preparing to pass a third motor vehicle 3, traveling at an even higher speed than the motorcycle, approaching from behind in the passing lane (left-hand traffic lane 4.2). In order to avoid the risk of a collision (indicated by lightning bolt 5), the motorcycle must accelerate when changing lanes or when passing, so that it changes to left-hand traffic lane 4.2 in time in front of third motor vehicle 3. At this point, the method according to the present invention engages which, on the one hand, enables a monitoring of the surroundings of motor vehicle 1, which is changing lanes or passing, for detecting the traffic situation and, on the other hand, enables an adaptation of the acceleration dynamics of motor vehicle 1, which is changing lanes or passing, to the detected traffic situation in each case. The speed of third motor vehicle 3 may, in particular, be ascertained with the aid of the method according to the present invention and may be related to the speed of the motorcycle or motor vehicle 1. The probability of a collision may then be calculated based on these data and, if necessary, an intervention may actively take place in the engine control of the motorcycle. The acceleration dynamics of the motorcycle may be varied, in particular, as a function of the particular traffic situation.

Figure 3:
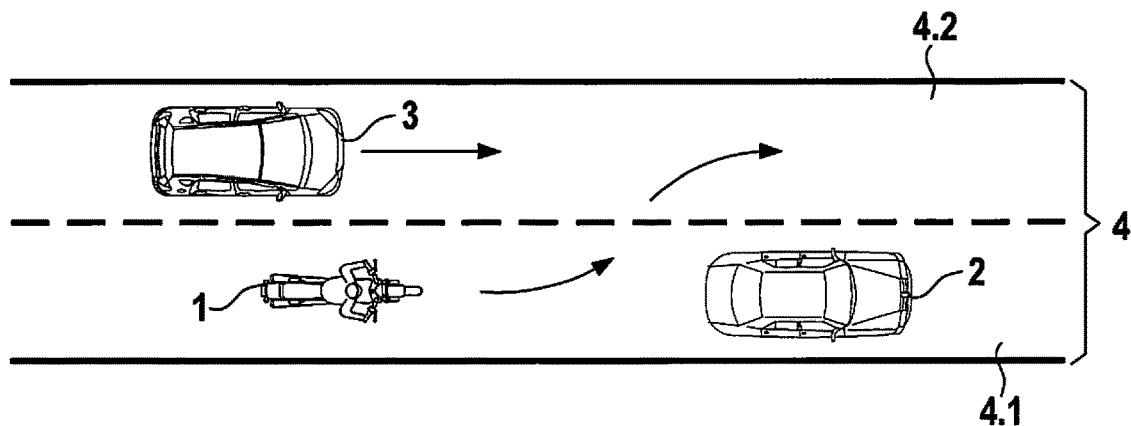
FIG. 3 shows a top view of a two-lane road for illustrating a third driving situation.

FIG. 3 illustrates a traffic situation, for example, which corresponds largely to that of FIG. 2. In this case, however, third motor vehicle 3 is traveling at a reduced speed, so that there is no risk of collision. Accordingly, the motorcycle may prepare to pass preceding motor vehicle 2 at the same or slightly higher speed. This passing maneuver is therefore less dynamic than the passing maneuver illustrated in FIG. 2, which results in an increase in comfort for the motorcyclist.

Figure 4:
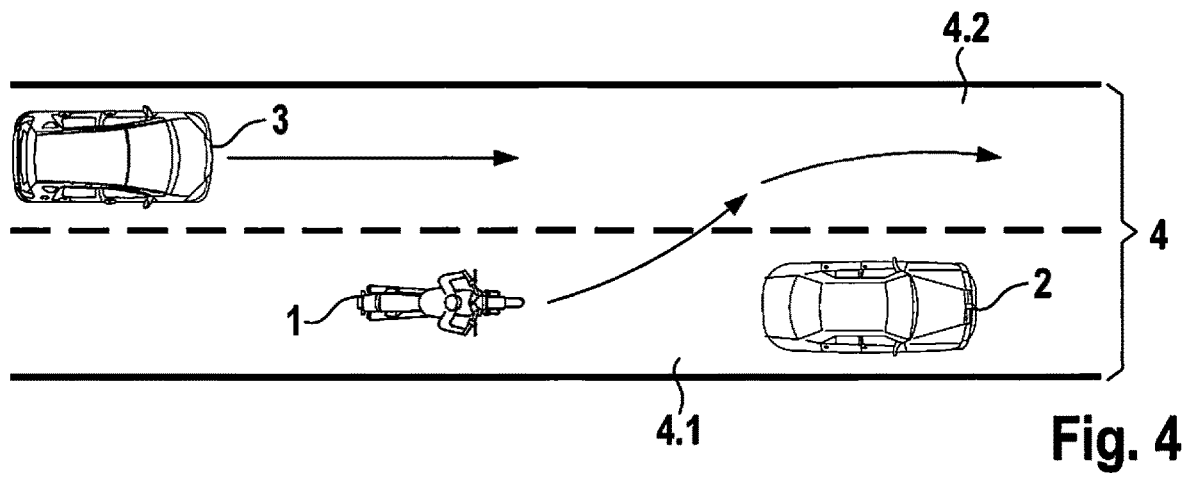
FIG. 4 shows a top view of a two-lane road for illustrating a fourth driving situation.

If, however, a third motor vehicle 3 approaches from behind in the passing lane at a very high speed, as illustrated, for example, in FIG. 4, the acceleration dynamics of the motorcycle must be significantly increased. So that this does not occur to the detriment of the comfort of the motorcyclist, the method according to the present invention is preferably carried out in a partially or fully automated manner. At the same time, the safety is increased as the driving maneuver is carried out.

An existing driver assistance system, in particular an adaptive cruise control, of the motor vehicle, which is changing lanes or passing, is preferably used when carrying out the method according to the present invention in an at least partially automated manner. This assumes that motor vehicle 1 is equipped with such a driver assistance system and that the driver assistance system is activated. In this case, the system's own sensor system (not depicted) may also be used to monitor the surroundings of motor vehicle 1. The sensor system includes at least one sensor (not depicted), which is aimed forward, rearward and/or toward one side of motor vehicle 1, the sensor potentially involving, in particular, an ultrasonic sensor and/or a radar sensor.

Figure 5:
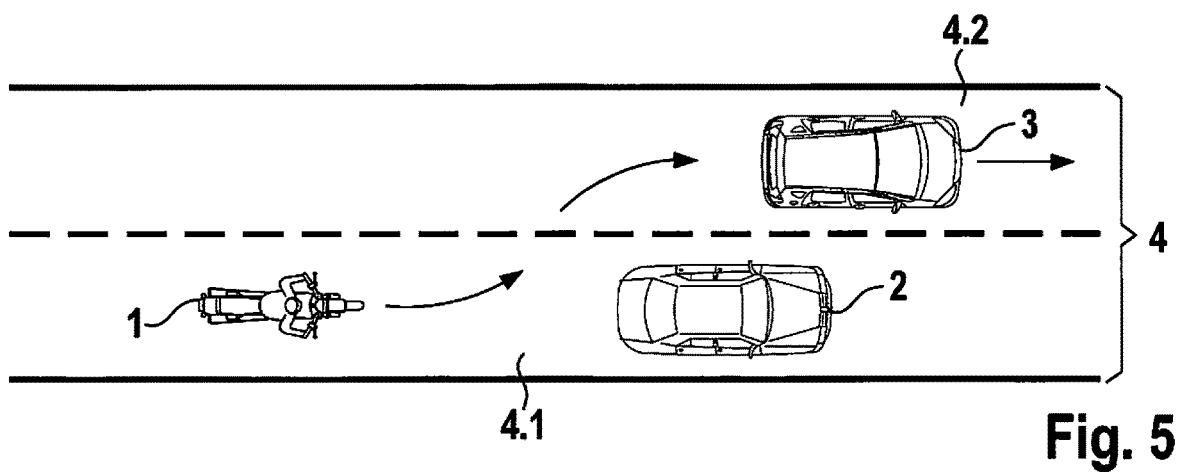
FIG. 5 shows a top view of a two-lane road for illustrating a fifth driving situation.

As illustrated by way of example in FIG. 5, the traffic situation may also include two motor vehicles 2, 3, which precede the motorcycle (motor vehicle 1). Motor vehicle 3 utilizes left-hand traffic lane 4.2 in order to pass motor vehicle 2 located in right-hand traffic lane 4.1. The speed of passing motor vehicle 3 in this case, however, is only slightly higher than the speed of motor vehicle 2. In the meantime, the motorcycle approaches the two motor vehicles 2, 3 from behind, the speed of the motorcycle being significantly higher than the speed of the two motor vehicles 2, 3. Accordingly, the speed of the motorcycle must be reduced before initiating a passing maneuver, so that the motorcycle does not run into motor vehicle 3. The speed of the motorcycle is advantageously adapted to that of motor vehicle 3.

Figure 6:
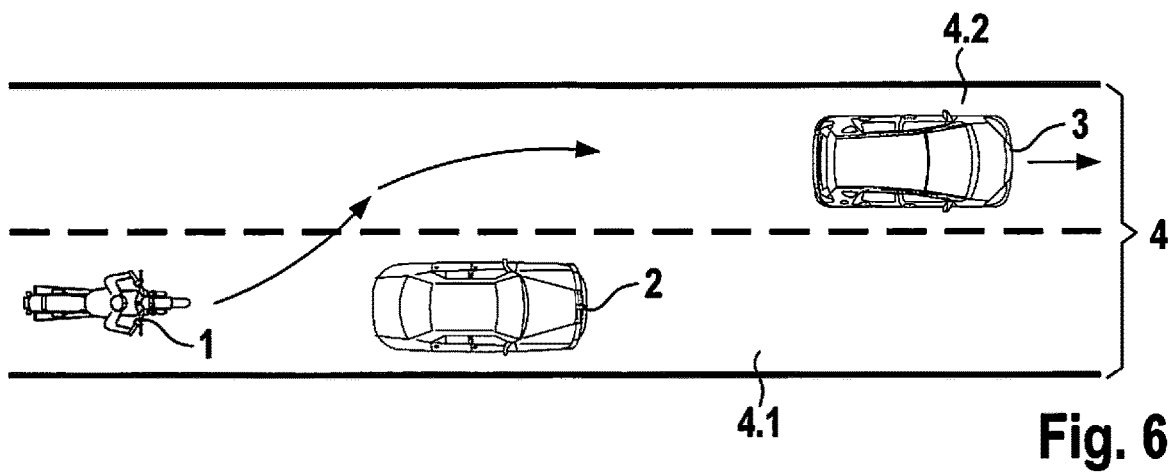
FIG. 6 shows a top view of a two-lane road for illustrating a sixth driving situation.

The situation is similar when, as illustrated by way of example in FIG. 6, motor vehicle 3 located in the passing lane (traffic lane 4.2) is moving at a significantly higher speed than motor vehicle 2 located in right-hand traffic lane 4.2. The speed of the motorcycle in turn may be adapted to the speed of motor vehicle 3, so that the passing maneuver is quickly completed. For this purpose, the acceleration dynamics of the motorcycle must be increased. This is advantageous, in particular, when a fourth motor vehicle (not depicted) approaches the motorcycle from behind at a high speed.

In a traffic situation, as it is illustrated by way of example in FIGS. 5 and 6, a sensory system is preferably used which includes at least one sensor aimed forward or to the front. A traffic situation, as it is illustrated by way of example in FIGS. 2 through 4, requires a sensor system which preferably includes at least one sensor aimed rearward or to the rear. Ideally, sensors aimed forward and rearward are used in combination. Alternatively or in addition, at least one sensor may be present which is aimed to one side of motor vehicle 1.

The advantages of the method provided according to the present invention may be seen, in particular, in that when carrying out a risky driving maneuver such as, for example, a lane change and/or a passing maneuver, the actual traffic situation is taken into account so that the acceleration dynamics of the motor vehicle 1 carrying out the driving maneuver may be adapted hereto. In contrast to FIGS. 1 through 6, motor vehicle 1 need not necessarily be a motorcycle.

Furthermore, the driver assistance system used in this case may be easily adapted to the particular driving behavior of other countries. This means that no other application parameters are necessary for these other countries.

In addition, the safety of road users involved in carrying out the particular driving maneuver is increased. At the same time, the comfort may be increased by carrying out the driving maneuver in an at least partially automated manner, which results in an increased acceptance by the user of the system.

What is claimed is:

1. A method for operating a motor vehicle, the motor vehicle being a motorcycle, the method comprising:
carrying out a driving maneuver, which includes a lane change to a traffic lane, in an at least partially automated manner;
ascertaining a relative speed of at least one other motor vehicle in the traffic lane using a sensor system of the motor vehicle;
increasing an acceleration dynamics of the motor vehicle to increase a speed of the motor vehicle, as a function of the relative speed of the at least one other motor vehicle, as the driving maneuver is carried out; and
adapting the speed of the motor vehicle carrying out the driving maneuver to a speed of the at least one other motor vehicle, including determining a difference between the speed of the motor vehicle carrying out the driving maneuver and the speed of the at least one other motor vehicle, and at least one: raising the speed of the motor vehicle carrying out the driving maneuver by the determined difference, or lowering the speed of the motor vehicle carrying out the driving maneuver by the determined difference.

2. The method as recited in claim 1, wherein the at least one other motor vehicle include a preceding motor vehicle and/or another motor vehicle approaching from behind.

3. The method as recited in claim 1, wherein the sensor system includes at least one sensor aimed forward and/or rearward and/or to a side of the motor vehicle carrying out the driving maneuver.

4. The method as recited in claim 3, wherein the relative speed of the at least one other motor vehicle is ascertained using at least one radar sensor and/or one ultrasonic sensor.

5. The method as recited in claim 4, wherein a probability of a collision is calculated on the basis of data detected with the aid of the sensor system and a warning device, which is physically perceptible by the driver, is activated when a collision is predicted and/or the driving maneuver is discontinued.

6. The method as recited claim 1, wherein the relative speed of the at least one other motor vehicle is ascertained using at least one sensor of an adaptive cruise control of the motor vehicle carrying out the driving maneuver.

7. The method as recited in claim 1, wherein the relative speed of the at least one other motor vehicle is ascertained using at least one sensor of a lane change assistance system of the motor vehicle carrying out the driving maneuver.

8. The method as recited in claim 1, wherein at least two sensors spaced apart from one another and each aimed to a side are used to ascertain the relative speed of the at least one other motor vehicle, with the aid of which a motor vehicle passing in a neighboring lane is chronologically successively detected and the relative speed of the motor vehicle is ascertained via the time difference between the detections.

9. The method as recited in claim 1, wherein the adapting adapts the speed of the motor vehicle carrying out the driving maneuver by raising the speed of the motor vehicle carrying out the driving maneuver by the determined difference.

10. The method as recited in claim 1, wherein the adapting adapts the speed of the motor vehicle carrying out the driving maneuver by lowering the speed of the motor vehicle carrying out the driving maneuver by the determined difference.

11. The method as recited in claim 1, wherein the at least one other motor vehicle includes a second motor vehicle approaching the motor vehicle from behind in the traffic lane.

12. The method as recited in claim 1, wherein the at least one other motor vehicle includes a second motor vehicle preceding the motor vehicle in the traffic lane.

13. A non-transitory machine-readable storage device on which is stored a computer program containing machine-readable instructions for operating a motor vehicle, the motor vehicle being a motorcycle, the computer program, when executed by a computer, causing the computer to perform:
carrying out a driving maneuver, which includes a lane change to a traffic lane, in an at least partially automated manner;
ascertaining a relative speed of at least one other motor vehicle in the traffic lane using a sensor system of the motor vehicle;
increasing an acceleration dynamics of the motor vehicle to increase a speed of the motor vehicle, as a function of the relative speed of the at least one other motor vehicle, as the driving maneuver is carried out; and
adapting the speed of the motor vehicle carrying out the driving maneuver to a speed of the at least one other motor vehicle, including determining a difference between the speed of the motor vehicle carrying out the driving maneuver and the speed of the at least one other motor vehicle, and at least one: raising the speed of the motor vehicle carrying out the driving maneuver by the determined difference, or lowering the speed of the motor vehicle carrying out the driving maneuver by the determined difference.

14. The non-transitory machine-readable storage device as recited in claim 13, wherein the adapting adapts the speed of the motor vehicle carrying out the driving maneuver by raising the speed of the motor vehicle carrying out the driving maneuver by the determined difference.

15. The non-transitory machine-readable storage device as recited in claim 13, wherein the adapting adapts the speed of the motor vehicle carrying out the driving maneuver by lowering the speed of the motor vehicle carrying out the driving maneuver by the determined difference.

* * * * *